United States Patent
Kobayashi et al.

(10) Patent No.: US 6,638,615 B2
(45) Date of Patent: Oct. 28, 2003

(54) CARBON-FIBERS AND A METHOD OF PRODUCING THEM

(75) Inventors: Masanobu Kobayashi, Ehime (JP); Mitsutoshi Ozaki, Ehime (JP); Youji Matsuhisa, Ehime (JP)

(73) Assignee: Toray Industries, Inc., Tokyo (JP)

( * ) Notice: Subject to any disclaimer, the term of this patent is extended or adjusted under 35 U.S.C. 154(b) by 24 days.

(21) Appl. No.: 10/060,194

(22) Filed: Feb. 1, 2002

(65) Prior Publication Data

US 2002/0150755 A1 Oct. 17, 2002

Related U.S. Application Data

(62) Division of application No. 09/380,438, filed as application No. PCT/JP98/05877 on Dec. 24, 1998, now Pat. No. 6,368,712.

(30) Foreign Application Priority Data

Jan. 6, 1998 (JP) .................................................. 10-803

(51) Int. Cl.$^7$ ................................................. B32B 9/00
(52) U.S. Cl. ........................ 428/367; 428/364; 428/375; 428/408
(58) Field of Search ................................ 428/367, 364, 428/375, 408

(56) References Cited

U.S. PATENT DOCUMENTS

| | | | |
|---|---|---|---|
| 3,837,904 A | 9/1974 | Hill | |
| 4,230,766 A | 10/1980 | Gaussens et al. | |
| 5,691,055 A | * 11/1997 | Kobayashi et al. | 428/367 |
| 5,817,418 A | 10/1998 | Goto et al. | |
| 6,368,712 B1 | * 4/2002 | Kobayashi et al. | 428/367 |
| 2002/0150755 A1 | * 10/2002 | Kobayashi et al. | 428/364 |

* cited by examiner

Primary Examiner—Cynthia H. Kelly
Assistant Examiner—J. M. Gray

(57) ABSTRACT

The carbon fibers of the present invention have the are configuration as stated below to achieve the object; carbon fibers, characterized in that a polymer having polar groups and groups capable of reacting with a matrix resin are deposited on the fiber surfaces.

Furthermore, the carbon fibers of the present invention can be produced by heating the carbon fibers, on the surfaces of which either (1) a monomer having both polar groups and groups capable of reacting with the matrix resin, or (2) the mixture of a monomer having polar groups and a monomer having groups capable of reacting with the matrix resin, is deposited, to polymerize the monomer.

The present invention can provide carbon fibers unlikely to cause fluffing and fiber breaking even if rubbed by guide bars and rollers in sophisticated processing, and since they are excellent in adhesion properties to the matrix resin, a carbon fiber reinforced composite material excellent in bending properties and compressive properties can be obtained.

5 Claims, No Drawings

CARBON-FIBERS AND A METHOD OF PRODUCING THEM

This is a division of application Ser. No. 09/380,438, filed on Dec. 9, 1999, now U.S. Pat. No. 6,368,712, which is a 371 of PCT/JP98/05877, filed Dec. 24, 1988.

TECHNICAL FIELD

The present invention relates to carbon fibers and a method of producing them. In more detail, the present invention relates to carbon fibers unlikely to be fluffed by abrasion, excellent in processability, excellent in adhesion properties to a matrix resin such as an unsaturated polyester resin, vinyl ester resin, phenol resin or epoxy resin, and capable of manifesting excellent bending properties and compressive properties as a composite material with the matrix resin, and also relates to a method of producing them.

BACKGROUND ART

Carbon fibers are being applied in such fields as sporting goods and aerospace components because of their excellent specific strength and specific elastic modulus, and in these fields, carbon fibers are being applied in a wider range.

On the other hand, carbon fibers are being used also as materials for forming energy related components such as CNG tanks, fly wheels, wind mills and turbine blades, as materials for reinforcing structural components of roads, bridge piers, etc. and as materials for forming or reinforcing building components such as timbers and curtain walls.

In the expansion of application fields of carbon fibers as described above, the matrix resins used for producing composite materials containing carbon fibers include a variety of resins such as epoxy resins, unsaturated polyester resins, vinyl ester resins and phenol resins. Especially unsaturated polyester resins and vinyl ester resins are used for small ships, boats, yachts, fishing boats, household waste water treatment tanks, various other tanks, etc, because of low material and molding costs. Furthermore, phenol resins are often used for interior materials of transport vehicles such as airplanes and for building members such as trusses because of their incombustibility. In these situations, carbon fibers excellent in adhesion properties to these matrix resins and good in processability are being demanded.

Especially if carbon fibers impregnated with a conventional epoxy resin sizing agent are used for fiber reinforced composite materials containing an unsaturated polyester resin or vinyl ester resin as the matrix resin, the adhesion between the carbon fibers and the unsaturated polyester resin or vinyl ester resin is lower, and especially the shear strength is lower than that between the carbon fibers and an epoxy resin, not often allowing practical application. Furthermore, these composite materials are lower in adhesion in a water absorbed state than in a dry state, and their use for fishing boats, yachts and other boats is often avoided.

Techniques for improving the adhesion between carbon fibers and unsaturated polyester resins are disclosed. For example, it is disclosed that the adhesion between carbon fibers and unsaturated polyester resins is improved by using an urethane compound with unsaturated groups (Japanese Patent Laid-Open (Kokai) Nos. Sho56-167715 or Sho63-50573) or an ester compound with unsaturated groups at the ends (Japanese Patent Laid-Open (Kokai) No. Sho63-105178) as a sizing agent also acting as a coupling agent. However, their effects are insufficient, and they do not assure excellent adhesion properties for every kind of carbon fibers. Especially carbon fibers with excellent adhesion properties even in a water absorbed state have not been obtained.

Furthermore, carbon fiber reinforced phenol resin composite materials are also low in the adhesion between carbon fibers and the matrix resin as in the case of unsaturated polyester resins and vinyl ester resins, and the excellent mechanical properties peculiar to carbon fibers are not sufficiently utilized. Accordingly, as a technique for improving the adhesion between carbon fibers and phenol resins, Japanese Patent Laid-Open (Kokai) No. Hei1-172428 discloses a method of improving adhesion by air oxidation treatment and titanate coupling agent treatment. However, the improvement is still insufficient.

Moreover, since carbon fibers are essentially stiff, brittle and poor in bindability, bending ability and abrasion resistance, they are likely to be fluffed or broken. Accordingly, they are usually impregnated with a sizing agent, but conventional sizing agents are insufficient in improving the bending ability and abrasion resistance of carbon fibers. It can happen that if such carbon fibers ace sophisticatedly processed, for example, woven into a fabric or filament-wound, they are rubbed by guide bars, rollers, etc., to be fluffed and broken, remarkably lowering working convenience and quality. At present, carbon fibers with high adhesion properties to resins and high sophisticated processability have not yet been obtained.

DISCLOSURE OF THE INVENTION

The object of the present invention is to provide carbon fibers unlikely to be fluffed and broken even when rubbed by guide bars and rollers in sophisticated processing and excellent in adhesion to matrix resins, and capable of manifesting excellent bending properties and compressive properties as composite materials, and also to provide a method of producing them.

To achieve the object of the present invention, the carbon fibers of the present invention are constituted as follows: Carbon fibers, characterized in that a polymer having polar groups and groups capable of reacting with a matrix resin is deposited on the fiber surfaces. In a preferable embodiment of the present invention, the polymer is substantially insoluble in the matrix resin and covers the fiber surfaces.

The carbon fibers of the present invention can be favorably produced by a production method, comprising the steps of heating carbon fibers, on the surfaces of which a monomer having polar groups and groups capable of reacting with the matrix resin is deposited, and polymerizing said monomer.

THE BEST EMBODIMENT OF THE INVENTION

The present invention is described below in more detail.

The carbon fibers of the present invention are characterized in that a polymer having polar groups and groups capable of reacting with the matrix resin are deposited on the fiber surfaces.

A polar group is a functional group having a polarized charge and a group capable of reacting with a matrix resin is a functional group capable of being chemically bonded to the matrix resin. In the carbon fibers, on the surfaces of which a polymer having these two kinds of functional group is deposited, since the polymer is diffused into a matrix resin at a low rate, the polar groups are strongly combined with the surfaces of carbon fibers while the groups capable of reacting with the matrix resin are chemically bonded to the matrix resin when the carbon fibers are used to mold a composite material, so, the obtained composite material can have high adhesion properties.

The mechanism by which such effects are manifested is considered to be as follows. If functional groups being polarized exist near the surfaces of carbon fibers, the basal planes or edge planes of the graphite structure on the carbon fiber surfaces adjacent to the polar groups are polarized, and electric attraction occurs between the polar groups and the carbon fiber surfaces. The adhesive strength is smaller than that of hydrogen bonds, but since the graphite structure exists over the entire carbon fiber surfaces, high adhesion can be obtained as a whole. To further enhance the adhesion in combination with hydrogen bonds, it is effective that a certain surface oxygen concentration, especially a certain amount of carboxyl groups exist on the carbon fiber surfaces. In this mechanism, it is essentially required that the compound with polar groups is localized on the carbon fiber surfaces. Therefore, it is important that the polymer having polar groups is formed as a homogeneous film on the carbon fiber surfaces, and that the polymer is not diffused into the matrix resin. Thus, the present invention is based on a quite new concept that the hitherto unheeded dipole-dipole interaction with the graphite structure of carbon fiber surfaces is used and fixed on the carbon fiber surfaces, in addition to the chemical adhesion with the matrix resin.

In the present invention, the polymer having polar groups and groups capable of reacting with the matrix resin is obtained by polymerizing a low molecular weight compound, specifically a monomer with a molecular weight (chemical formula weight) of 1000 or less. The polymer is not limited in molecular weight as far as it is substantially insoluble in the matrix resin, but to suppress diffusion, it is preferable that the weight average molecular weight is 2000 to 1,000,000, though it is only require that the polymer is substantially insoluble in the matrix resin. A low molecular weight compound having both polar groups and groups capable of reacting with the matrix resin can be used as a monomer, or both a low molecular weight compound having polar groups and a low molecular weight compound having groups capable of reacting with the matrix resin can also be used as monomers.

The polar groups which can be used here include those containing nitrogen such as nitro groups, nitroso groups, amino groups, methylamino groups, dimethylamino groups, anilino groups, acetamido groups, benzamido groups, imino groups, phenylimino groups, hydroxyamino groups, nitroaminlo groups, hydrazide groups, diazo groups, azoxy groups, phenylazo groups, cyano groups, isocyano groups, carbamoyl groups, ureido groups, amidino groups, guanidido groups, urethane groups, urea groups and amido groups, those containing sulfur such as mercapto groups, sulfinyl groups, sufo groups, sulfamoyl groups, methylthio groups, ethylthio groups, tosyl groups, thiourea groups, thiourethane groups and sulfonyl groups, and those containing a heterocycle such as $\alpha(\beta)$-thienyl groups, $\alpha(\beta)$-thenyl groups, $\alpha(\beta)$-pyrrolyl groups and $\alpha(\beta,\gamma)$-pyridyl groups. Especially in view of the stability and industrial handling convenience of the compound in its application to the carbon fiber surfaces, the polar groups can be more preferably selected from amido groups, imido groups, urethane groups and urea groups.

The groups capable of reacting with the matrix resin include those likely to cause radical reaction such as vinyl groups, acryloyl groups, methacryloyl groups, halogen-containing groups, azo groups and peroxide groups if a vinyl ester resin or unsaturated polyester resin is used as the matrix resin. In the present invention, having regard to the stability and industrial handling convenience of the compound in its application to the carbon fiber surfaces, and the likelihood to react with the matrix resin, they can be preferably selected from vinyl groups, acrylate groups and methacrylate groups respectively having unsaturated groups at the ends. Furthermore if a phenol resin is used as the matrix resin, the groups capable of reacting with the matrix resin can be structures having hydroxybenzyl groups, hydroxyphenoxy groups, phenoxy groups, phenolic hydroxyl groups, etc. If an epoxy resin is used as the matrix resin, the groups capable of reacting with the matrix resin can be epoxy groups, hydroxyl groups, carboxyl groups, amino groups, etc.

In the present invention, among the polymer having polar groups and groups capable of reacting with the matrix resin, a polymer component substantially insoluble in the matrix resin covers the surfaces of carbon fibers. Accordingly, the diffusion of the polymer into the matrix resin is substantially suppressed, and when the carbon fibers are used to mold a composite material, the polar groups are strongly combined with substantially all the surfaces of carbon fibers, and the groups capable of reacting with the matrix resin are chemically combined with the matrix resin. Therefore, the obtained composite material can have high adhesion properties stably. Furthermore, since interfaces between the carbon fibers and the matrix resin are so strong as to inhibit the intrusion of water into the interfaces when water is absorbed, high adhesion properties can be obtained advantageously even when the fiber reinforced composite material absorbs water.

Being substantially insoluble in the matrix resin means being insoluble in the solvent of the matrix resin. For example, if the matrix resin is a vinyl ester resin or unsaturated polyester resin, the polymer must be substantially insoluble in styrene. If the matrix resin is a phenol resin, the polymer must be substantially insoluble in methanol. If the matrix resin is an epoxy resin, the polymer must be substantially insoluble in chloroform.

It is preferable that the polymer insoluble in the matrix resin covers the carbon fiber surfaces substantially uniformly, i.e., as a film, using the production method described later. It is preferable that the film thickness is 1 to 20 nm. A more preferable range is 2 to 10 nm.

To avoid hardening of the carbon fiber bundle by the deposited polymer, it is desirable that the deposited amount of the deposit containing the polymer having the polar groups and the groups capable of reacting with the matrix resin is 0.01 wt % to 5 wt % based on the weight of carbon fibers. A preferable range is 0.05 wt % to 2 wt %, and a more preferable range is 0.05 wt % to 1 wt %. Furthermore, for letting the polymer uniformly cover the carbon fiber surfaces, it is desirable that among the polymer, the polymer component insoluble in the matrix resin is deposited in an amount of 0.01 to 1.0 wt % to cover the fiber surfaces. If the deposited amount of the polymer component insoluble in the matrix resin is less than 0.01 wt %, the bindability of the carbon fiber bundle is insufficient, and depending on the matrix resin used, a sufficient adhesive strength may not be obtained between the carbon fibers and the matrix resin. If more than about 1 wt %, the carbon fiber bundle becomes hard though a sufficient adhesive strength can be obtained between the carbon fibers and the matrix resin, and the gaps between the single fibers constituting the carbon fiber bundle cannot be sufficiently impregnated with the matrix resins, so that voids are formed in the molded composite material. As a result, the mechanical properties of the composite material may decline.

In the present invention, the deposited amount of all the deposit containing the polymer on the carbon fibers can be measured as described below. 2 to 3 grams of carbon fibers with the deposit are heat-treated in nitrogen atmosphere at 450° C. for 10 minutes, and the deposited amount of the deposit is obtained from the weights measured before and after heat treatment.

In the present invention, the deposited amount of the polymer component insoluble in styrene can be measured as described below. A 500 ml beaker is charged with 2 to 4 g of carbon fibers with the deposit and 100 to 200 ml of styrene, and they are washed by an ultrasonic washer (frequency 45 kHz, high frequency output 60 W) at a liquid temperature of 20 to 30° C. for 10 minutes. Styrene is removed, and the residue is washed with distilled water 2 or 3 times and dried at 100° C. for 60 minutes. From the weights measured before and after treatment, the deposited amount of the deposit soluble in styrene is obtained, and subtracted from the deposited amount of all the deposit, to obtain the deposited amount of the polymer component insoluble in styrene. This value can be an indicator of the deposited amount of the polymer component insoluble in a vinyl ester resin or unsaturated polyester resin. In the examples described later, B2200 produced by Yamato K.K. is used as the ultrasonic washer.

The deposited amount of the polymer component insoluble in methanol can be measured as described below. A general purpose reflux device is used to reflux 2 to 3 g of carbon fibers with the deposit over methanol for 6 hours and dried at 100° C. for 60 minutes. From the weights measured before and after treatment, the deposited amount of the deposit soluble in methanol is obtained and subtracted from the deposited amount of all the deposit, to obtain the deposited amount of the polymer component insoluble in methanol. This value can be an indicator of the deposited amount of the polymer component insoluble in a phenol resin.

Furthermore, in the present invention, the deposited amount of the polymer component insoluble in chloroform can be measured as described below. A general purpose reflux device is used to reflux 2 to 3 g of carbon fibers with the deposit over chloroform for 6 hours and dried at 100° C. for 60 minutes. From the weights measured before and after treatment, the deposited amount of the deposit soluble in chloroform is obtained and subtracted from the deposited amount of all the deposit, to obtain the deposited amount of the polymer component insoluble in chloroform. This value can be an indicator of the deposited amount of the polymer component insoluble in an epoxy resin.

In the present invention, it is desirable for improving the adhesion that the surfaces of the carbon fibers with the polymer deposited have a surface oxygen concentration O/C ratio of 0.02 to 0.3 as measured by the X-ray photoelectron spectroscopy. A preferable range is 0.04 to 0.2, and a more preferable range is 0.06 to 0.15. It is also desirable that the surface carboxyl group concentration COOH/C ratio as measured by the chemical modification X-ray photoelectron spectroscopy is 0.2 to 3%. A preferable range is 0.5 to 3%. In this case, strong interaction occurs between the polar groups of the polymer and the functional groups of carbon fiber surfaces, to allow strong adhesion not achieved hitherto. Thus high adhesion properties can be obtained in the composite material. If O/C is more than 0.3, an oxide layer much lower in strength than the carbon fiber substrate may cover the carbon fiber surfaces to lower the adhesion properties of the obtained composite material, though the chemical adhesion between the polymer having the polar groups and the groups capable of reacting with the matrix resin and the outermost carbon fiber surfaces becomes strong. If less than 0.02, the reactivity and amount reacting with the polymer having the polar groups and the groups capable of reacting with the matrix resin become insufficient, and it may not be expected to improve the adhesion properties of the composite material.

If COOH/C ratio is more than 3%, an oxide layer much lower in strength than the carbon fiber substrate may cover the carbon fiber surfaces, and as a result, the adhesion properties of the obtained composite material may become low. If less than 0.2%, the reactivity and reacting amount with the polymer having the polar groups and the groups capable of reacting with the matrix resin become insufficient, and it may not be expected to improve the adhesion properties of the composite material.

In the present invention, the surface oxygen concentration O/C ratio of the carbon fiber surfaces is measured by the X-ray photoelectron spectroscopy according to the following procedure. At first, a carbon fiber bundle is cut and the cut pieces are spread on a sample base made of stainless steel, with the electron emitting angle set to 90°, with MgK$\alpha$1,2 used as the X-ray source, and with the sample chamber internally kept at a vacuum degree of $1\times10^{-8}$ Torr. In compensation for the peaks accompanying the electrostatic charge during the measurement, the binding energy B.E. of the main peak of $C_{1S}$ is set at 284.6 eV. The $C_{1S}$ peak area is obtained by drawing a linear base line in a range of 282 to 296 eV, and the $O_{1S}$ peak area is obtained by drawing a linear base line in a range of 528 to 540 eV. The surface oxygen concentration O/C ratio is expressed by the atomic ratio calculated by dividing the ratio of said $O_{1S}$ peak area to $C_{1S}$ peak area by relative sensitivity factor unique to the apparatus. In the examples described later, ESCA-750 produced by Shimadzu Corp. is used as the X-ray photoelectron spectroscope, and the relative sensitivity factor of the apparatus is 2.85.

In the present invention, the surface carboxyl group concentration COOH/C ratio of the carbon fiber surfaces is measured by chemical modification X-ray photoelectron spectroscopy according to the following procedure. At first, a carbon fiber bundle is cut and the cut pieces are spread on a sample base made of platinum and exposed to air containing 0.02 mole/liter of trifluoroethanol gas, 0.001 mole/liter of dichlorohexylcarbodiimide gas and 0.04 mole/liter of pyridine gas at 60° C. for 8 hours, to be chemically modified. They are mounted on an X-ray photoelectron spectroscopy with the electron emitting angle of 35°, and with AlK$\alpha$1,2 used as the X-ray source, and with the sample chamber internally kept at a vacuum degree of $1\times10^{-8}$ Torr. In compensation for the peaks accompanying the electrostatic charge during the measurement, the binding energy B.E. of the main peak of $C_{1S}$ is set at 284.6 eV. The $C_{1S}$ peak area $[C_{1S}]$ is calculated by drawing a linear base line in a range of 282 to 296 eV, and the $F_{1S}$ peak area $[F_{1S}]$ is calculated by drawing a linear base line in a range of 682 to 695 eV. Furthermore, from the $C_{1S}$ peak split of chemically modified polyacrylic acid, the reactivity rate r is calculated from the $C_{1S}$ peak separation of polyacrylic acid, the persistence rate m was calculated from the $O_{1S}$ peak separation of dicyclohexylcarbodiimide derivative, which were chemically modified at the same time.

The surface carboxyl group concentration COOH/C ratio is calculated from the following formula:

$$\text{COOH/C} = \frac{[F_{1S}]}{(3k[[C_{1S}] - (2+13m)\,[F_{1S}])r} \times 100 \; (\%)$$

where k is the relative sensitivity factor of the $F_{1S}$ peak area to the $C_{1S}$ peak area peculiar to the apparatus, and the relative sensitivity factor of Model SSX-100–206 produced by SSI, USA used as the X-ray photoelectron spectroscope in the examples described later is 3.919.

To measure the surface oxygen concentration O/C ratio and the surface carboxyl group concentration COOH/C ratio in the carbon fibers with the deposit, the carbon fibers obtained by removing the deposit according to the following procedure are used. That is, the carbon fibers with the deposit are refluxed over a mixture of chloroform and methanol (ratio by volume 1:2) for 6 hours, and washed with methanol, being immersed in 98% concentrated sulfuric acid for a whole day and night, to remove the deposit from the carbon fibers. Furthermore, the carbon fibers are washed again with methanol and dried by a hot air dryer.

To produce the carbon fibers with the polymer deposited, as described later, it is preferable to deposit a sizing agent with any of said monomers dissolved or dispersed in a solvent, on carbon fiber surfaces, and to heat them for removing the solvent while polymerizing the monomer. The solvent which can be used in this case can be an organic solvent such as methanol, ethanol, acetone, methyl ethyl ketone, dimethylformamide or dimethylacetamide, etc., but having regard to disaster prevention, water is preferable. Since the monomer is often insoluble in water, an emulsifying agent is generally added to make an emulsion. However, since the emulsifying agent does not have either the polar groups or the groups capable of reacting with the matrix resin, it is desirable that the ratio by weight of the monomer to the emulsifying agent is 70~95:30~5. A preferable range is 80~95:20~5. The monomer destined to be a polymer at this mixing ratio can easily provide a stable water dispersion, and carbon fibers capable of manifesting high mechanical properties in a composite material can be obtained. If the amount of the emulsifying agent based on the weight of all the monomers is more than 30 wt %, the emulsifying agent covers the carbon fiber surfaces at a higher ratio, to lower the adhesive properties of the composite material, and the adhesion properties after water absorption may decline. If less than 5 wt %, the emulsification stability of a sizing agent with water as the solvent may decline.

As the emulsifying agent, it is desirable to use a nonionic emulsifying agent. The nonionic emulsifying agent can be one or more in combination selected from ether type emulsifying agents such as polyoxyethylene alkyl ethers, single chain length polyoxyethylene alkyl ethers, polyoxyethylene secondary alcohol ethers, polyoxyethylene alkyl phenyl ethers, polyoxyethylene sterol ethers, polyoxyethylene lanolin derivatives, ethylene oxide derivatives of alkyl phenol formalin condensation products, polyoxyethylene polyoxypropylene block copolymer and polyoxyethylene polyoxypropylene alkyl ethers, ether ester type emulsifying agents such as polyoxyethylene glycerol fatty acid esters, polyoxyethylene castor oil and hardened castor oil, polyoxyethylene sorbitan fatty acid esters and polyoxyethylene sorbitol fatty acid esters, and ester type emulsifying agents such as polyethylene glycol fatty acid esters and polyglycerol fatty acid esters. Preferably used nonionic emulsifying agents include alkylene oxide (e.g., ethylene oxide, propylene oxide or butylene oxide) addition products (block or random addition products in the case of two or more alkylene oxide addition products) of phenols selected from (1) monocyclic phenols (phenols having one aromatic ring) such as phenol, phenols having one or more alkyl groups, and polyhydric phenols and (2) polycyclic phenols (phenols with two or more aromatic rings) such as phenylphenol, cumylphenol, benzylphenol, hydroquinone monopheyl ether, naphthol, bisphenol, reaction products (styrenated phenols) between a monocyclic phenol or polycyclic phenol, etc. and a styrene (styrene or α-methylstyrene, etc.), etc. Among them, an ethylene oxide addition product or propylene oxide addition product of a styrenated phenol can be preferably used. The method for adding an alkylene oxide to such a phenol can be any ordinary method. It is preferable that the number of moles added is 1 to 120. A more preferable range is 10 to 90, and an especially preferable range is 30 to 80.

In addition to the nonionic emulsifying agent, an anionic surfactant such as a carboxylate, sulfonate, sulfate or phosphate, a cationic surfactant such as an aliphatic amine salt or fatty acid quaternary ammonium salt or an amphoteric surfactant such as carboxybetaine type or aminocarboxylate can also be used for further stabilizing the emulsion.

When an unsaturated polyester or vinyl ester resin is used as the matrix resin, a compound obtained by letting an unsaturated alcohol or an unsaturated carboxylic acid and an isocyanate compound react with each other can be suitably used as the monomer. A compound obtained by letting an unsaturated alcohol and an isocyanate compound react with each other can be especially suitably used.

The unsaturated alcohols which can be used here include olefin alcohols, reaction products between an unsaturated carboxylic acid and a polyol, etc. The olefin alcohols include, for example, allyl alcohol, crotyl alcohol, 3-butene-1-ol, 3-butene-2-ol, 3-pentene-1-ol, 4-pentene-1-ol, 4-pentene-2-ol, 4-hexene-1-ol, 5-hexane-1-ol, etc., and an olefin alcohol with unsaturated groups at the ends is preferably suitable for enhancing the molecular weight described later. The reaction products between an unsaturated carboxylic acid and a polyol include, for example, 2-hydroxyethyl (meth)acrylate, 2-hydroxypropyl (meth)acrylate, 2-hydroxybutyl (meth)acrylate, 2-hydroxy-3-phenoxypropyl (meth)acrylate, 2-(meth)acryloyloxyethylphthalic acid, 2-hydroxy-3-(meth)acryloyloxypropyl (meth)acrylate, ethylene glycol mono(meth)acrylate, diethylene glycol mono(meth)acrylate, polyethylene glycol mono(meth)acrylate, polypropylene glycol mono(meth)acrylate, polyethylene glycol polypropylene glycol mono(meth)acrylate, 1,6-hexanediol mono(meth)acrylate, neopentyl glycol mono(meth)acrylate, trimethylolpropane di(meth)acrylate, bisphenol A diglycidyl ether(meth)acrylic acid addition product, etc. A reaction product between an unsaturated carboxylic acid and a polyol can be preferably used.

The unsaturated carboxylic acids which can be used here include acrylic acid, methacrylic acid, oleic acid, maleic acid, fumaric acid, itaconic acid, etc. The polyols which can be preferably used here include, for example, glycerol, ethylene glycol, diethylene glycol, polyethylene glycol, polypropylene glycol, polyalkylene glycol, arabitol, sorbitol, 1,6-hexanemethylene diol, etc.

The isocyanate compounds which can be used here include, for example, known isocyanate compounds such as tolylene diisocyanate, ditolylene diisocyanate, diphenylmethane diisocyanate, dimethyldiphenylmethane diisocyanate, hexamethylene diisocyanate, metaphenylene diisocyanate, propyl isocyanate, and butyl isocyanate. Especially to ensure the flexibility of the carbon fiber bundle after application to the carbon fibers, an aliphatic structure without containing any aromatic ring such as 1,6-hexamethylene diisocyanate, propyl isocyanate or butyl isocyanate can be preferably used.

Any of the above unsaturated alcohols or any of the above unsaturated carboxylic acids and any of the above isocyanate compounds are properly combined, and proper reaction conditions are selected from known urethanation reaction conditions. After completion of reaction, the reaction solvent is removed, to easily obtain the intended compound.

As the reaction product, an unsaturated polyurethane compound with acrylate groups and methacrylate groups as the unsaturated groups at the ends is preferable, and at least one compound selected from phenylglycidyl ether acrylate hexamethylene diisocyanate, phenylglycidyl ether acrylate tolylene diisocyanate, pentaerytbritol acrylate hexamethylene diisocyanate, phenylglycidyl ether triacrylate isophorone diisocyanate, glycerol dimethacrylate tolylene diisocyanate, glycerol dimethacrylate isophorone diisocyanate, pentaerythritol triacrylate tolylene diisocyanate, pentaerythritol triacrylate isophorone diisocyanate and triallyl isocyanurate can be used.

It is preferable that the number of unsaturated groups at the ends is two or more per monomer molecule, for easily and uniformly enhancing the molecular weight on the carbon fiber surfaces to form a film and for causing reaction with an unsaturated polyester resin or vinyl ester resin. Three or more unsaturated groups are more preferable. If a monomer with one unsaturated group at an end is heated and polymerized on the carbon fiber surfaces, the reaction with the matrix resin does not progress since the number of functional groups capable of reacting with the matrix resin is small, and it can happen that the adhesion properties of the composite material do not improve.

To ensure the interaction with a specific amount of functional groups on the carbon fiber surfaces when a film is formed on the carbon fiber surfaces, it is preferable that the polar group density as the number of polar groups per molecular weight (chemical formula weight) of the monomer is $1 \times 10^{-3}$ or more per molecular weight. A polar group density of $3 \times 10^{-3}$ or more per molecular weight is more preferable. Usually the upper limit is $15 \times 10^{-3}$ or less per molecular weight, and preferable is $7 \times 10^{-3}$ or less per molecular weight.

As for the structure of a preferable low molecular weight compound, a flexible aliphatic compound which allows the molecular weight to be raised easily on the carbon fiber surfaces, does not have any three-dimensionally large stiff compound at the interfaces between the carbon fibers and the matrix resin and has molecular chains without any aromatic ring arranged linearly is preferable. Especially an aliphatic polyisocyanate compound having unsaturated groups at the ends and polar groups, i.e., a polyisocyanate compound having a polyethylene glycol structure and a polyalkylene structure is preferable since the polymer can be deposited on the carbon fiber surfaces to improve both abrasion resistance and fluff resistance.

It is preferable that the molecular weight (chemical formula weight) of the compound is 300 to 2000 for preventing that its handling convenience as a bundling agent becomes poor due to a high resin viscosity. A more preferable range is 500 to 1000.

If a phenol resin is used as the matrix resin, highly reactive hydroxybenzyl groups, hydroxyphenoxy groups, phenoxy groups and phenolic hydroxyl groups are especially preferable as the groups capable of reacting with the matrix resin having regard to the stability and industrial handling convenience of the compound in its application to carbon fibers. Low molecular weight compounds having both the groups capable of reacting with a phenol resin and the polar groups, which can be used here include phenylglycidyl ether acrylate hexamethylene diisocyanate, phenylglycidyl ether tolylene diisocyanate and phenylglycidyl ether isophorone diisocyanate.

When a low molecular weight compound having the polar groups and a low molecular weight having the groups capable of reacting with a phenol resin are used as monomers to make a copolymer, it is desirable to use an aromatic compound having unsaturated groups at the ends and hydroxybenzyl groups, hydroxyphenoxy groups, phenoxy groups or phenolic hydroxyl groups as the former low molecular weight compound and to use a compound having the polar groups and unsaturated groups at the ends as the latter low molecular weight compound. Specifically the compounds which can be used as the former low molecular weight compound include 2-allylphenol, phenoxyethyl (meth)acrylate. phenoxy polyethylene glycol (meth) acrylate, 2-hydroxy-3-phenoxypropyl (meth)acrylate, etc.

If an epoxy resin is used as the matrix resin, the groups capable of reacting with the matrix resin should be highly reactive epoxy groups, and having regard to the stability and industrial handling convenience of the compound in its application to carbon fibers, an epoxy compound having a hydantoin structure or an epoxy compound having an isocyanurate structure, etc. can be used as the monomer having both the groups capable of reacting with the matrix resin and the polar groups.

When a lower molecular weight compound having the polar groups and a lower molecular weight compound having the groups capable of reacting with an epoxy resin are used as monomers to make a copolymer, it is desirable to use a compound having unsaturated groups at the ends and epoxy groups as the former low molecular weight compound and to use a compound having the polar groups and unsaturated groups at the ends as the latter low molecular weight compound. Specifically the compounds which can be used as the former low molecular weight compound include glycidol, glycidyl methacrylate, glycidyl methacrylate ethylene oxide addition product, glycidyl methacrylate ethylene oxide/propylene oxide block copolymer addition product, etc.

It is preferable that the carbon fibers of the present invention have a strand strength of 3000 MPa or more. More preferable is 4000 MPa or more, and still more preferable is 4500 MPa or more. Furthermore, it is preferable that the strand modulus is 200 GPa or more. More preferable is 220 GPa or more. The composite material obtained by using such carbon fibers can manifest desired properties. The strand strength and strand modulus of carbon fibers refer to the strength and modulus measured according to the resin impregnated strand testing methods of JIS R 7601 using a resin consisting of Bakelite (registered trademark ERL4221/3 produced by Union Carbidelboron fluoride monoethylamine/acetone=100¾ (arts by weight). It is preferable that the strand strength and modulus are larger, but at present their upper limits are about 7000 MPa and 800 GPa respectively.

The method for producing the carbon fibers of the present invention are described below.

The carbon fibers of the present invention can be obtained by depositing a monomer having polar groups and groups capable of reacting with a matrix resin on the fiber surfaces, heating the carbon fibers and polymerizing the monomer. Specifically the monomer is deposited on a carbon fiber bundle which is preliminarily dried by a heating roller and primarily dried using a hot air dryer, and then the monomer is thermally polymerized. After the monomer is deposited, the fiber bundle can be opened to be fixed in the opened state by preliminarily drying using a heating roller, as so-called thermal fixing. Furthermore, it is preferable to carry out the primary drying and the thermal polymerization simultaneously since the obtained carbon fiber bundle can be kept flexible. If flexibility can be ensured, the preliminary drying can also be omitted.

To make the monomer deposited on the fiber surfaces, at first, a sizing solution with the monomer dissolved or dispersed in a solvent such as water, methanol, ethanol, dimethylformamide, dimethylacetamide or acetone, etc. is prepared, and the fibers are immersed in the sizing solution by feeding over a roller, or the fibers can be brought into contact with a roller with the sizing isolation deposited on it, or the sizing solution can be blown onto the fibers as a mist. This process can be effected by batch operation, but for higher productivity and smaller variation, continuous operation is desirable. In this case, to provide a suitable amount of the monomer deposited uniformly onto the carbon fibers, it is preferable to control the monomer content in the sizing solution, the temperature of the sizing solution, the tension applied to the fibers, etc., and as required, to ultrasonically vibrate the carbon fibers. Furthermore, as the solvent used for the sizing solution, water is preferable since it is easy to handle having regard to disaster prevention.

For uniform application of the monomer into the carbon fiber bundle, it is important to preliminarily dry the carbon fibers by a heating roller while opening it, for thermal fixing. The opening and thermal fixing allows the monomer to be uniformly applied into the carbon fiber bundle and can prevent the excessive bindability of the carbon fiber bundle in the subsequent step of thermal polymerization, for keeping the carbon fiber bundle flexible. The effect can be more remarkably observed when a carbon fiber bundle consisting of more than 10,000 filaments, especially more than 15,000 filaments is used. It is preferable that the thermally drying roller temperature in this case is insufficient for during to prevent the fluffing and filament breaking caused otherwise when the drying in the opened state is perfect, i.e., a range from 100° C. to 200° C. which is lower than the primary drying temperature stated below.

The carbon fibers with the sizing solution deposited thereon have the solvent substantially perfectly removed by the primary drying, and are heat-treated to polymerize the monomer on the fiber surfaces. It is preferable to effect the step of heat treatment for primary drying and the step of heat treatment for polymerizing the monomer simultaneously, since the productivity is higher and since the monomer can be polymerized with the fiber bundle opened to keep the carbon fiber bundle flexible.

Furthermore, in the present invention, to keep the insoluble matter in the matrix resin at a specific amount, it is preferable to enhance the molecular weight on the carbon fiber surfaces, and for this purpose, it is preferable that the drying temperature is higher than the polymerization initiation temperature. It is preferable that the drying temperature is 150° C. to 350° C. A more preferable range is 180° C. to 300° C., and an especially more preferable range is 200° C. to 250° C. The treatment time depends on the heat treatment temperature, but it is preferable that the treatment time is 30 seconds to 30 minutes. A more preferable range is 50 seconds to 15 minutes.

Such auxiliary ingredients as an emulsifying agent and a surfactant for improving the handling convenience, abrasion resistance and fluff resistance of carbon fibers can also be added to the sizing solution. Furthermore, to still improve the bindability, etc., another compound such as a polyurethane, polyester or epoxy resin can also be added to the sizing solution, but to keep the polar group density in the deposit, it is preferable that the added amount of these compounds is kept at 30 wt % or less of all the deposit. More preferable is 15 wt % or less.

Raw carbon fibers which can be used here include acrylic carbon fibers, pitch based carbon fibers, rayon based carbon fibers, etc. Among them, acrylic carbon fibers are preferable since long fibers with a high strength are likely to be obtained. The method for producing acrylic carbon fibers as raw carbon fibers is described below.

As for the spinning method for obtaining acrylic fibers, wet spinning, dry spinning, semi-wet spinning, etc. can be used. However, wet spinning or semi-wet spinning is preferable since high strength fibers are likely to be obtained, and semi-wet spinning is more preferable. The spinning dope used is a solution or suspension of polyacrylonitrile homopolymer or copolymer. The fibers formed by any of the above spinning methods are usually washed with water, drawn and oiled to make precursor fibers destined to be carbon fibers. The precursor fibers are stabilized in an oxidizing atmosphere such as air at 200 to 300° C. and carbonized in an inactive atmosphere such as nitrogen with the maximum temperature kept at higher than 1200° C., preferably higher than 1300° C. Furthermore, as required, they may be graphitized. To improve the strength and modulus of carbon fibers, it is preferable to keep the diameter of single filaments small, specifically at 10 $\mu$m or less. More preferable is 8 $\mu$m or less, and still more preferable is 6 $\mu$m or less.

The carbonized or graphitized fibers are further oxidized on the surfaces. As the surface oxidation treatment, electrolytic surface treatment for electrochemically oxidizing with fibers as the anode is preferable. The electrolytic solution used for the electrolytic surface treatment can be either an acid aqueous solution or alkaline aqueous solution. However, an acid aqueous solution is desirable since the carboxyl group concentration COOH/C ratio of fiber surfaces can be easily increased.

The acid electrolyte can be any compound which becomes acid as an aqueous solution. The acid electrolytes which can be used here include inorganic acids such as sulfuric acid, nitric acid, hydrochloric acid, phosphoric acid, boric acid and carbonic acid, organic acids such as acetic acid, butyric acid, oxalic acid, acrylic acid and maleic acid, and salts such as ammonium sulfate and ammonium hydrogensulfate. Among them, sulfuric acid and nitric acid which show strong acidity are preferable. The alkaline electrolyte can be any compound which becomes alkaline as an aqueous solution. The alkaline electrolytes which can be used here include hydroxides such as sodium hydroxide, potassium hydroxide and barium hydroxide, ammonia, inorganic salts such as sodium carbonate and sodium hydrogencarbonate, organic salts such as sodium acetate and sodium benzoate, their potassium salts, barium salts and other metal salts, ammonium salts and organic compounds such as hydrazine. It is preferable to use inorganic alkalis such as ammonium carbonate and ammonium hydrogencarbonate which do not contain any alkali metal causing the problem of hardening with the resin. It is more preferable to use tetraalkylammonium hydroxides which show strong alkalinity.

It is preferable that the electrolyte concentration in the electrolytic solution is 0.01 to 5 moles/liter. A more preferable range is 0.1 to 1 mole/liter. It is preferable that the temperature of the electrolytic solution is 0 to 100° C. More preferable is room temperature.

The quantity of electrolytic treatment is optimized to suit the carbonization temperature of the carbon fibers to be electrolytically treated on the surfaces. High modulus fibers carbonized at higher temperatures require a larger quantity of electrolytic treatment, but it is preferable that the quantity of electrolytic treatment is 1 to 1000 coulombs (coulombs per 1 g of carbon fibers)for promoting the decline of crystallinity in the surface layer, improving productivity, preventing the decline of strength of the carbon fiber substrate and keeping the decline of crystallinity in the surface layer in a moderate range. A more preferable range is 3 to 300 coulombs/g. The time taken for the electrolytic surface treatment should be optimized with reference to the quantity of electrolytic treatment and the concentration of the electrolyte solution, but having regard to productivity a preferable range is several seconds to about 10 minutes A more preferable range is 10 seconds to about 2 minutes. Having regard to safety, it is preferable that the electrolytic voltage in the electrolytic surface treatment is 25 V or less. A more preferable range is 0.5 to 20 V. The electrolytic surface treatment can be carried out by batch operation, but for higher productivity and less variation, continuous operation is desirable. As for the method of electrolyzing the fibers, either the direct electrolyzation to bring the carbon fibers into direct contact with an electrode roller or the indirect electrolyzation to energize with an electrolytic solution, etc. kept between the carbon fibers and the electrode can be used. However, it is desirable to adopt the indirect electrolyzation since the fluffing, electric sparks, etc. during electrolytic treatment can be prevented. As for the electrolyzer used for the electrolytic surface treatment, electrolytic cells, as many as necessary, can be connected in series for continuous treatment, or one electrolytic cell can be used for treatment repetitively as often as necessary. It is preferable that the length of the cathode cell with a cathode immersed therein is 10 to 1000 mm. A more preferable range is 300 to 900 mm. When the indirect electrolyization is adopted, it is preferable that the length of the anode cell with an anode immersed therein is 5 to 100 mm.

The electrolytic surface treated fibers are then washed with water and dried. If the drying temperature in this case is too high, the functional groups, especially carboxyl groups existing on the outermost surfaces of carbon fibers are likely to vanish because of thermal decomposition. Accordingly, it is preferable to dry at a temperature as low as possible, specifically at 100° C. to 250° C. A more preferable range is 100° C. to 210° C., and a still more preferable range is 100° C. to 180° C.

Undergoing such a step of surface oxidation treatment is suitable for obtaining raw carbon fibers having fiber surfaces showing the said specific surface oxygen concentration O/C ratio and surface carboxyl group concentration COOH/C ratio.

EXAMPLES

The present invention is described below more specifically with reference to examples. In these examples, unidirectional test pieces of fiber reinforced composite materials were prepared as described below.

A vinyl ester resin composite material was obtained by setting a metallic frame with carbon fibers wound around it in unidirection into a mold, pouring 100 parts of a vinyl ester resin (Ripoxy (registered trademark) R806 produced by Showa Highpolymer), 0.5 part of cobalt naphthenate (Cobalt N produced by Showa Highpolymer) and 1.0 part of methyl ethyl ketone peroxide (Permeck N produced by NOF Corp.) into the mold, deaerating in vacuum, press-molding (at room temperature for 24 hours), and post-hardening at 120° C. for 2 hours, to obtain a molded vinyl ester resin board with a fiber content of 55 to 65 vol %.

An unsaturated polyester resin composite material was obtained by setting a metallic frame with carbon fibers wound around it in unidirection into a mold, pouring 100 parts of an unsaturated polyester resin (Polymal 8225P(W) produced by Takeda Chemical) and 0.5 part of methyl ethyl ketone peroxide (Permeck N produced by NOF Corp.) into the mold, deaerating in vacuum, press-molding (at room temperature for 24 hours), and post-hardening at 120° C. for 2 hours, to obtain a molded unsaturated polyester resin board with a fiber content of 55 to 65 vol %.

A phenol resin composite material was obtained by setting a metallic frame with carbon fibers wound around it in unidirection into a mold, pouring 100 parts of a phenol resin (BRL-240 produced by Showa Highpolymer) and 30 parts of a hardening catalyst (FRH-30 produced by Showa Highpolymer) into the mold, deaerating in vacuum, and press-molding (at 60° C. for 2 hours and at 150° C. for 1 hour), to obtain a molded phenol board with a fiber content of 55 to 65 vol %.

An epoxy resin composite material was obtained by setting a metallic frame with carbon fibers wound around it in unidirection into a mold, pouring 100 parts of an epoxy resin (Epikote (registered trademark) 828 produced by Yuka Shell) and 3 parts of a hardening catalyst (BF3-MEA) into the mold, deaerating in vacuum, and press-molding (at 170° C. for 1 hour), to obtain a molded epoxy resin board with a fiber content of 55 to 65 vol %.

The mechanical properties of fiber reinforced composite materials were obtained as described below.

The inter-layer shear strength (hereinafter abbreviated as ILSS) was obtained by testing a unidirectional 2.5 mm thick. 6 mm wide and 16 mm long test piece using an ordinary three-point bending test jig (indenter 10 mm dia. fulcrum 4 mm dia.) at a support span of 14 mm at a strain rate of 2.0 mm/min.

The ILSS after water absorption was obtained by immersing a similar test piece to the above into distilled water at 98 to 100° C. for 16 hours, and measuring as described above in the water absorbed state.

The bending strength was obtained by testing a unidirectional 2 mm thick, 15 mm wide and 100 mm long test piece using a three-point bending test jig (indenter 10 mm dia., fulcrum 10 mm dia.) at a support span of 80 mm at a strain rate of 1.5 mm/min.

The compressive strength was obtained according to Method A of JIS K 7076 using a molded unidirectional 1 mm thick board.

Furthermore the sophisticated processability of carbon fibers in the examples was evaluated according to the following methods.

For the abrasion fluff, an abrasion device was used, in which five stainless rods with a diameter of 10 mm (chromium plated, surface roughness 1~1.5 S) were arranged in parallel to each other at 50 mm intervals in such a zigzag manner that a carbon fiber yarn could pass over their surfaces in contact with them at a contact angle of 120°. The carbon fiber yarn was passed through the device at an inlet tension of 0.09 g per denier at 3 m/min, and a laser beam was applied from a lateral side in a direction perpendicular to the yarn. The number of fluff partides was counted by a fluff detector and expressed in pieces/m.

The flexibility of a carbon fiber bundle (hereinafter expressed as the flexibility of a CF bundle) was evaluated by touching the carbon fiber bundle. If the carbon fiber bundle was bent when it was touched without applying any force and if it could be easily separated into single filament sets respectively consisting of less than about tens of filaments, the flexibility was judged to be good. On the other hand, if the carbon fiber bundle was bent with a force applied without being little divided into sets of filaments, the flexibility was judged to be poor.

Example 1

A copolymer consisting of 99.4 mol % of acrylonitrile (AN) and 0.6 mol % of methacrylic acid was spun by semi-wet spinning to obtain an acrylic fiber bundle consisting of 12000 filaments with a single filament fineness of 1.1 deniers. The obtained fiber bundle was heated in 240 to 280° C. air at a drawing ratio of 1.0, to be converted into stabilized fibers, and they were drawn by 5% in a nitrogen atmosphere at a heating rate of 200° C./min in a temperature range from 300 to 900° C., and carbonized up to 1300° C. while being contracted by 3%. The yield of the obtained carbon fibers was 0.80 g/m, and the specific weight was 1.80.

The carbon fibers were electrolytically treated on the surfaces using 0.1 mole/liter sulfuric acid in aqueous solution as the electrolyte at 5 coulombs per 1 g of carbon fibers. The electrolytically surface treated carbon fibers were in succession washed with water and dried in 150° C. heating air, to obtain raw carbon fibers. The surface oxygen concentration O/C ratio and surface carboxyl group concentration COOH/C ratio of the raw carbon fibers are shown in Table 1.

In succession, glycerol dimethacrylate hexamethylene diisocyanate (monomer A: molecular weight 625) (UA101H produced by Kyoeisha Chemical) as a monomer having urethane groups as the polar groups and methacryloyl groups as the groups capable of reacting with a vinyl ester resin was diluted by acetone, to prepare a sizing solution, and applied to the raw carbon fibers by immersion. The raw carbon fibers impregnated with the sizing solution was preliminarily dried by a hot roller at 150° C. for 5 seconds, and primarily dried and polymerized at 230° C. for 120 seconds. The deposited amount of all the deposit was 1.1 wt %, and the deposited amount of the polymer component insoluble in styrene was 0.15 wt %.

The carbon fibers obtained in this manner had a strand strength of 5.2 GPa and a strand modulus of 240 GPa. The ILSS of the composite material with the vinyl ester resin as the matrix resin was 85 MPa, and the ILSS of the composite material after water absorption was 77 MPa, showing a retention ratio of 91%. Thus, the composite material had high adhesion properties and high water absorption resistance. The bending strength was 1350 MPa and the compressive strength was 1170 MPa. The abrasion fluff was as few as 3 pieces/m. and the flexibility of the CF bundle was good, showing that the carbon fiber bundle had high sophisticated processability.

Examples 2 and 3

Carbon fibers of on which the deposited amount of all the deposit was 1.0 wt % (Example 2) and carbon fibers on which the deposited amount of all the deposit was 1.2 wt % (Example 3) were obtained as described for Example 1, except that the pentaerythritol triacrylate hexamethylene diisocyanate (monomer B: molecular weight 765) (UA306H produced by Kyoeisha Chemical) as a monomer having urethane groups as the polar groups and acryloyl groups and methacryloyl groups as the groups capable of reacting with the matrix resin or phenyl glycidyl ether acrylate hexamethylene diisocyanate (monomer C: molecular weight 613) (AH600 produced by Kyoeisha Chemical) was used as the monomer. Respective properties of the composite materials with the vinyl ester resin as the matrix resin were measured, and the results, etc. are shown in Table 1.

Example 4

Carbon fibers on which the deposited amount of all the deposit was 1.2wt % were obtained as described for Example 1, except that phenyl glycidyl ether acrylate tolylene diisocyanate (monomer D: molecular weight 619) (AT600 produced by Kyoeisha Chemical) with an aromatic structure was used as the monomer. Respective properties of the composite material with the vinyl ester resin as the matrix resin were measured, and the results, etc. are shown in Table 1.

Comparative Example 1

Carbon fibers on which the deposited amount of all the deposit was 1.0 wt % were obtained as described for Example 1, except that trimethylolpropane triacrylate without having any polar groups was used as the monomer. Respective properties of the composite material with the vinyl ester resin as the matrix resin were measured, and the results, etc. are shown in Table 1. The ILSS was 75 MPa, and the ILSS after water absorption was 58 MPa, showing a low retention ratio of 77%. The bending strength was 1250 MPa. and the compressive strength was 1080 MPa, respectively being much lower than those of Example 1. The abrasion fluff was 5 pieces/m, and the flexibility of the CF bundle was good.

Comparative Example 2

Carbon fibers were obtained as described for Example 1, except that no monomer was added. Respective properties of the composite material with the vinyl ester resin as the matrix resin were measured, and the results, etc. are shown in Table 1. The ILSS was 76 MPa, and the ILSS after water absorption was 60 MPa, showing a low retention ratio of 79%. The bending strength was 1260 MPa and the compressive strength was 1060 MPa, respectively being much lower than those of Example 1. The abrasion fluff was as many as 20 pieces/m, and the flexibility of the CF bundle was good.

Comparative Example 3

Carbon fibers were obtained as described for Example 1, except that an epoxy resin (Epikote (registered trademark) 828, produced by Yuka Shell) was used as the monomer. Respective properties of the composite material with the vinyl ester resin as the matrix resin were measured, and the results are shown in Table 1. The ILSS was 77 MPa, and the ILSS after water absorption was 57 MPa, showing a low retention ratio of 74%. The bending strength was 1250 MPa and the compressive strength was 1070 MPa. respectively being much lower than those of Example 1. The abrasion fluff was 6 piece/m, and the flexibility of the CF bundle was rather poor.

Examples 5 and 6

Carbon fibers were obtained as described for Example 1, except that the quantity of electrolytic treatment was changed to 10 or 40 coulombs/g. The deposited amounts of all the deposits were 1.2 wt % and 1.3 wt % respectively. Respective properties of the composite materials with the vinyl ester resin as the matrix resin were measured, and the results, etc. are shown in Table 1.

Example 7

Carbon fibers on which the deposited amount of all the deposit was 1.1 wt % were obtained as described for Example 1, except that the drying temperature after the electrolytic surface treatment was 250° C. Respective properties of the composite material with the vinyl ester resin as the matrix resin were measured, and the results, etc. are shown in Table 1.

Examples 8 to 10

Carbon fibers were obtained as described for Example 1, except that the thermal polymerization temperature after applying the monomer was changed to 180° C., 150° C. or 80° C. The deposited amounts of all the deposits were 1.2 wt %, 1.2 wt % and 1.1 wt % respectively Respective properties of the composite materials with the vinyl ester resin as the matrix resin were measured, and the results, etc. are shown in Table 2.

Examples 11 to 13

Carbon fibers were obtained as described for Example 1, except that bisphenol S diglycidyl dimethacrylate as a monomer having sulfo groups as the polar groups and methacryloyl groups as the groups capable of reacting with the vinyl ester resin, N,N-dimethylaminoethyl acrylate as a monomer having amino groups as the polar groups and acryloyl groups as the groups capable of reacting with the vinyl ester resin, or end acryl modified liquid butadiene (TE2000 produced by Nippon Soda) as a monomer having urethane groups as the polar groups and end vinyl groups as the groups capable of reacting with the vinyl ester resin was used as the monomer. The deposited amounts of all the deposits were 1.2 wt %, 0.9 wt % and 1.3 wt % respectively. Respective properties of the composite materials with the vinyl ester resin as the matrix resin were measured, and the results, etc. are shown in Table 3.

Example 14

Glycerol dimethacrylate hexamethylene diisocyanate (monomer A) as a monomer having urethane resins as the polar groups and methacryloyl groups as the groups capable of reacting with the vinyl ester resin was dispersed into water using polyoxyethylene (70-mole) styrenated (5-mole) cumylphenol (ratio by weight 90:10) (emulsifying agent A) as a nonionic emulsifying agent to prepare a sizing solution, and it was applied to the raw carbon fibers used in Example 1 by immersion. The carbon fibers impregnated with the sizing solution were dried by a 150° C. hot drying roller for 5 seconds, and in succession heat-treated by a hot air circulation type dryer at 230° C. for 60 seconds. The deposited amount of all the deposit was 0.6 wt %, and the amount of the matter insoluble in styrene was 0.15 wt %.

The abrasion fluff of the obtained carbon fibers, the flexibility of the CF bundles the ILSS of the composite material with the vinyl ester resin as the matrix resin, and the bending strength were measured, and the results are shown in Table 4. The compressive strength was 1160 MPa.

Examples 15 to 17

Carbon fibers were obtained as described for Example 14, except that the ratio of the monomer to the emulsifying agent was changed. Respective properties were measured and the results are shown in Table 4.

Examples 18 and 19

Carbon fibers were obtained as described for Example 14, except that the drying temperature after the electrolytic surface treatment was changed to 150° C. or 180° C. and that the deposited amount of the polymer component insoluble in styrene was changed to 005 wt % or 0.10 wt %. Respective properties were measured, and the results are shown in Table 4.

Examples 20 and 21

Carbon fibers were obtained as described for Example 14, except that the deposited amount of all the deposit was changed to 1.0 wt % or 0.10 wt %. Respective properties were measured and the results are shown in Table 4.

Comparative Example 4

Carbon fibers were obtained as described for Example 14, except that an epoxy resin (Epikote (registered trademark) 828, produced by Yuka Shell) was used as the monomer. Respective properties were measure and the results are shown in Table 4. The compressive strength of the composite material with the vinyl ester resin as the matrix resin was 1050 MPa.

Examples 22 to 24

Carbon fibers were obtained as described for Example 14, except that pentaerythritol triacrylate hexamethylene diisocyanate (monomer B), phenyl glycidyl ether acrylate hexamethylene diisocyanate (monomer C) or pentaerythritol triacrylate tolylene diisocyanate (monomer E: molecular weight 770) was used as the monomer. Respective properties of the composite materials with the vinyl ester resin as the matrix resin were measured and the results are shown in Table 5.

Examples 25 and 26

Carbon fibers were obtained as described for Example 14, except that polyoxyethylene styrenated phenyl ether (emulsifying agent B) or polyoxyethylene (40-mole) styrenated (5-mole) cumylphenol (emulsifying agent C) was used as the emulsifying agent. Respective properties of the composite materials with the vinyl ester resin as the matrix resin were measured and the results are shown in Table 5.

Example 27

The ILSS of the composite material consisting of the polymer deposited carbon fibers obtained in Example 14 and the unsaturated polyester resin was 83 MPa, and the ILSS of the composite material after water absorption was 66 MPa.

Comparative Example 5

The ILSS of the composite material consisting of the polymer deposited carbon fibers obtained in Comparative Example 3 and the unsaturated polyester resin was 52 MPa, and the ILSS of the composite material after water absorption was 48 MPa.

Example 28

To obtain a polymer having urethane groups as the polar groups and vinyl groups as the groups capable of reacting with the phenol resin, a mixture consisting of glycerol dimethacrylate hexamethylene diisocyanate (monomer A) and 2-allylphenol (ratio by weight 50:50) was used as the monomer, and its acetone solution was prepared as the sizing solution. It was applied to the raw carbon fibers used in Example 1 by immersion, and the carbon fibers impregnated with the sizing solution were dried by a 150° C. hot drying roller for 5 seconds and in succession treated by a hot air circulation type dryer at 230° C. for 60 seconds for thermal polymerization. The deposited amount of all the deposit was 0.5 wt %, and the deposited amount of the polymer component insoluble in methanol was 0.05 wt %.

The ILSS and the bending strength of the composite material consisting of the obtained carbon fibers and the phenol resin are shown in Table 6. The ILSS was 59 MPa, and the bending strength was 1780 MPa, showing high adhesion properties. The abrasion fluff was 4 pieces/m, and the flexibility of the carbon fiber bundle was good, showing high sophisticated processability.

Examples 29 to 33

Carbon fibers were obtained as described for Example 28, except that a mixture consisting of glycerol dimethacrylate hexamethylene diisocyanate and phenoxyethyl acrylate, a mixture consisting of glycerol dimethacrylate hexamethylene diisocyanate and phenoxy polyethylene glycol methacrylate, a mixture consisting of glycerol dimethacrylate hexamethylene diisocyanate and 2-hydroxy-3-phenoxypropyl methacrylate, phenylglycidyl ether acrylate hexamethylene diisocyanate (monomer C) or phenylglycidyl ether acrylate tolylene diisocyanate (monomer D) was used as the monomer.

The ILSSs and bending strengths of the composite materials consisting of the obtained carbon fibers and the phenol resin are shown in Table 6.

Example 34

Carbon fibers were obtained as described for Example 28, except that phenylglycidyl ether acrylate tolylene diisocyanate (monomer D) was used as the monomer and that the nonionic emulsifying agent was added to the sizing solution, to make an emulsion (the ratio by weight of the monomer D: the nonionic emulsifying agent was 80:20). The abrasion fluff was 5 pieces/m and the flexibility of the CF bundle was good. The ILSS of the composite material consisting of the obtained carbon fibers and the phenol resin is shown in Table 6.

Comparative Examples 6 and 7

Carbon fibers were obtained as described for Example 28, except that bisphenol A diglycidyl ether alone or glycerol dimethacrylate hexamethylene diisocyanate alone was used as the monomer. The ILSSs and the bending strengths of the composite materials consisting of the obtained carbon fibers and the phenol resin are shown in Table 6.

Example 35

Raw carbon fibers were obtained as described for Example 1, except that the electrolytic surface treatment was effected using an aqueous solution of ammonium hydrogencarbonate with a concentration of 3 mole/liter as the electrolyte at 80 coulombs/g-CF. The surface oxygen concentration ratio O/C of the raw carbon fibers was 0.14, and the surface carboxyl group concentration COOH/C ratio was 1.3%. In succession, to obtain a polymer having hydantoin structures as the polar groups and epoxy groups as the groups capable of reacting with the epoxy resin, the reaction product between dimethylhydantoin and hexamethylene diglycidyl ether was used as the monomer, and its ethanol solution was prepared. It was applied to the raw carbon fibers by immersion. The carbon fibers impregnated with the ethanol solution was dried by a 150° C. hot drying roller for 5 seconds and in succession treated by a hot air circulation type dryer at 210° C. for 60 seconds for thermal polymerization. The deposited amount of all the deposit was 0.5 wt %, and the deposited amount of the polymer component insoluble in chloroform was 0.05 wt %.

The ILSS of the composite material consisting of the obtained carbon fibers and the epoxy resin is shown in Table 7. The ILSS was 90 MPa, showing high adhesion properties. The abrasion fluff was 3 pieces/m, and the flexibility of the CF bundle was good, showing high sophisticated processability. The compressive strength of the composite material was 1560 MPa.

Examples 36 to 39

Carbon fibers were obtained as described for Example 33, except that a reaction product between dimethylhydantoin and diethylene glycol diglycidyl ether, a reaction product between dimethylhydantoin and polymethylolpropane polyglycidyl ether, a reaction product between trihexamethylene isocyanurate and glycidol or a mixture consisting of glycerol dimethacrylate hexamethylene diisocyanate (monomer A) and glycidyl methacrylate ethylene oxide (5-mole) propylene oxide (2-mole) addition product (ratio by weight 50:50) was used as the monomer. The ILSSs of the composite materials consisting of the obtained carbon fibers and the epoxy resin are shown in Table 7.

Comparative Examples 8 and 9

Carbon fibers were obtained as described for Example 34, except that bisphenol A diglycidyl ether alone or glycerol dimethacrylate hexamethylene diisocyanate alone was used as the monomer. The ILSSs of the composite materials consisting of the obtained carbon fibers and the epoxy resin are shown in Table 7. The compressive strength of Comparative Example 8 was 1460 GPa.

TABLE 1

(Vinyl ester resin)

|  | 0/C | COOH/C | Monomer | Polar group density (×10⁻³ piece/ molecular weight) | Number of unsaturated groups at ends (pieces) | Polymerization temperature (° C.) | ILSS (MPa) |
|---|---|---|---|---|---|---|---|
| Example 1 | 0.10 | 1.2% | Glycerol dimethacrylate hexamethylene diisocyanate | 3.2 | 4 | 230 | 85 |
| Example 2 | 0.10 | 1.2% | Pentaerythritol triacrylate hexamethylene diisocyanate | 2.6 | 6 | 230 | 86 |
| Example 3 | 0.10 | 1.2% | Phenylglycidyl ether acrylate hexamethylone diisocyanate | 3.4 | 2 | 230 | 81 |
| Example 4 | 0.10 | 1.2% | Phenylglycidyl ether acrylate tolylene diisocyanate | 3.4 | 2 | 230 | 79 |
| Comparative Example 1 | 0.10 | 1.2% | Trimethylolpropane triacrylate | 0 | 3 | 230 | 75 |
| Comparative Example 2 | 0.10 | 1.2% | — | — | — | 230 | 76 |
| Comparative Example 3 | 0.10 | 1.2% | Bisphenol A diglycidyl ether | 0 | 0 | 230 | 77 |
| Example 5 | 0.15 | 2.1% | Glycerol dimethacrylate hexamethylene diisocyanate | 3.2 | 4 | 230 | 86 |
| Example 6 | 0.20 | 2.4% | Glycerol dimethacrylate hexamethylene diisocyanate | 3.2 | 4 | 230 | 84 |
| Example 7 | 0.09 | 0.5% | Glycerol dimethacrylate hexamethylene diisocyanate | 3.2 | 4 | 230 | 80 |

TABLE 2

(Vinyl ester resin)

|  | Monomer | Polar group density (×10⁻³ piece/ molecular weight) | Number of un- saturated groups at ends (pieces) | Polymerization temperature (° C.) | ILSS (MPa) | ILSS after water absorption (MPa) | Retension ratio (%) |
|---|---|---|---|---|---|---|---|
| Example 1 | Glycerol dimethacrylate hexamethylene diisocyanate | 3.2 | 4 | 230 | 85 | 77 | 91 |
| Example 8 | Glycerol dimethacrylate hexamethylene diisocyanate | 3.2 | 4 | 180 | 84 | 76 | 90 |
| Example 9 | Glycerol dimethacrylate hexamethylene diisocyanate | 3.2 | 4 | 150 | 81 | 69 | 85 |
| Example 10 | Glycerol dimethacrylate hexamethylene diisocyanate | 3.2 | 4 | 80 | 80 | 60 | 76 |

TABLE 3

(Vinyl ester resin)

|  | 0/C | COOH/C | Monomer | Polar group density (×10⁻³ piece/molecular weight) | Number of unsaturated groups at ends (pieces) | Polymerization temperature (° C.) | ILSS (MPa) |
|---|---|---|---|---|---|---|---|
| Example 1 | 0.10 | 1.2% | Glycerol dimethacrylate hexamethylene diisocyanate | 3.2 | 4 | 230 | 85 |
| Example 11 | 0.10 | 1 2% | Bisphenol S diglycidyl methacrylate | 3.2 | 2 | 230 | 80 |
| Example 12 | 0.10 | 1.2% | N,N-dimethylaminoethyl acrylate | 7.0 | 1 | 230 | 79 |
| Example 13 | 0.10 | 1.2% | End acryl modified liquid butadiene | 2.0 | >5 | 230 | 78 |

TABLE 4

(Vinyl ester resin)

|  | Monomer | Solvent | Emulsi- fying agent | Ingredient ratio | Deposited amount of all the deposit (wt %) | Deposited amount of matter insoluble in styrene (wt %) | Abrasion fluff (pieces/m) | Flexibility of CF bundle | ILSS (MPa) | ILSS after water absorption (MPa) | Reten- tion ratio (%) | Bending strength (MPa) |
|---|---|---|---|---|---|---|---|---|---|---|---|---|
| Example 14 | A | Water | A | 90:10 | 0.5 | 0 15 | 3 | Good | 84 | 77 | 92 | 1350 |
| Example 15 | A | Water | A | 80:20 | 0 5 | 0.13 | 3 | Good | 83 | 74 | 80 | 1330 |

TABLE 4-continued (Vinyl ester resin)

| | Monomer | Solvent | Emulsifying agent | Ingredient ratio | Deposited amount of all the deposit (wt %) | Deposited amount of matter insoluble in styrene (wt %) | Abrasion fluff (pieces/m) | Flexibility of CF bundle | ILSS (MPa) | ILSS after water absorption (MPa) | Retention ratio (%) | Bending strength (MPa) |
|---|---|---|---|---|---|---|---|---|---|---|---|---|
| Example 16 | A | Water | A | 70:30 | 0.5 | 0.15 | 3 | Good | 79 | 65 | 82 | 1280 |
| Example 17 | A | Water | A | 60:40 | 0.5 | 0.05 | 2 | Good | 75 | 60 | 80 | 1250 |
| Example 18 | A | Water | A | 90:10 | 0.5 | 0 05 | 4 | Good | 81 | 70 | 86 | 1290 |
| Example 19 | A | Water | A | 90:10 | 0.5 | 0.10 | 3 | Good | 83 | 76 | 92 | 1310 |
| Example 20 | A | Water | A | 90:10 | 1.0 | 0.30 | 2 | Rather poor | 85 | 79 | 93 | 1340 |
| Example 21 | A | Weter | A | 90:10 | 0.1 | 0.02 | 15 | Rather poor | 78 | 68 | 84 | 1270 |
| Comparative Example 4 | Ep828 | Water | A | 90:10 | 0.5 | 0.11 | 6 | Rather poor | 76 | 56 | 74 | 1240 |

TABLE 5

(Vinyl ester resin)

| | Monomer | Solvent | Emulsifying agent | Ingredient ratio | Deposited amount of all the deposit (wt. %) | Deposited amount of matter insoluble in sytrene (wt. %) | Abrasion fluff (pieces/m) | Flexibility of CF bundle | ILSS (MPa) | ILSS after water absorption (MPa) | Retention ratio (%) | Bending strength (MPa) |
|---|---|---|---|---|---|---|---|---|---|---|---|---|
| Example 14 | A | Water | A | 90.10 | 0.5 | 0.15 | 3 | good | 84 | 77 | 92 | 1350 |
| Example 22 | C | Water | A | 90:10 | 0.5 | 0.12 | 3 | good | 85 | 77 | 91 | 1370 |
| Example 23 | B | Water | A | 90:10 | 0.5 | 0.18 | 3 | good | 83 | 76 | 92 | 1340 |
| Example 24 | E | Water | A | 90:10 | 0.5 | 0.15 | 4 | good | 82 | 75 | 92 | 1320 |
| Example 25 | A | Water | B | 90:10 | 0.5 | 0.16 | 3 | good | 84 | 77 | 92 | 1340 |
| Example 26 | A | Water | C | 90:10 | 1.5 | 0.15 | 2 | good | 83 | 76 | 92 | 1320 |

TABLE 6

(Phenol resin)

| | Monomer | ILSS(MPa) | Bending strength(MPa) |
|---|---|---|---|
| Example 28 | Glycerol dimethacrylate hexamethylene diisocyanate and 2-allylphenol | 59 | 1780 |
| Example 29 | Glycerol dimethacrylate hexamethylene diisocyanate and phenoxyethyl monoacrylate | 53 | — |
| Example 30 | Glycerol dimethacrylate hexamethylene diisocyanate and phenoxy diethylene glycol monomethacrylate | 53 | — |
| Example 31 | Glycerol dimethacrylate hexamethylene diisocyanate and hydroxy-3-phenoxypropyl monomethacrylate | 54 | — |
| Example 32 | Phenylglycidyl ether acrylate hexamethylene diisocyanate | 61 | — |
| Example 33 | Phenylglycidyl ether acrylate tolylene diisocyanate | 62 | 1820 |
| Example 34 | Phenylglycidyl ether acrylate tolylene diisocyanate (nonionic emulsifying agent) | 60 | — |
| Comparative Example 6 | Bisphenol A glycidyl ether | 43 | 1660 |
| Comparative Example 7 | Glycerol dimethacrylate hexamethylene diisocyanate | 49 | — |

TABLE 7

(Epoxy resin)

| | Monomer | ILSS(MPa) |
|---|---|---|
| Example 35 | Reaction product between dimethylhydantoin and hexamethylene diglycidyl ether | 90 |
| Example 36 | Reaction product between dimethylhydantoin and diethylene glycol diglycidyl ether | 90 |
| Example 37 | Reaction product between dimethylhydantoin and polymethylolpropane polyglycidyl ether | 90 |
| Example 38 | Reaction product between trihexamethylene isocyanurate and glycidol | 90 |
| Example 39 | Glycerol dimethacrylate hexamethylene diisocyanate and glycidyl methacrylate ethylene oxide (5-mole) propylene oxide (2-mole) addition product | 88 |
| Comparative Example 8 | Bisphenol A diglycidyl ether | 83 |

TABLE 7-continued (Epoxy resin)

| Monomer | | ILSS(MPa) |
|---|---|---|
| Comparative Example 9 | Glycerol dimethacrylate hexamethylene diisocyanate | 83 |

Industrial Applicability

The present invention can provide carbon fibers unlikely to cause fluffing and fiber breaking even when rubbed by guide bars and rollers in sophisticated processing, excellent in adhesion properties to the matrix resin, and also excellent in the bending properties and compressive properties of the composite material obtained using the carbon fibers.

The carbon fibers of the present invention in combination with an unsaturated polyester resin or vinyl ester resin can be preferably used for small ships, boats, yachts, fishing boats, household waste water treatment tanks, various other tanks, etc., and the carbon fibers of the present invention in combination with a phenol resin can be preferably used for interior materials of transport vehicles such as airplanes, architectural members such as trusses, etc.

What is claimed is:

1. Carbon fibers comprising a composition deposited on a surface of said carbon fibers comprising a polymer having at least one polar group and at least one group capable of reacting with a matrix resin, wherein the polymer is substantially insoluble in said matrix resin and said polar group is selected from the group consisting of amido groups, imido groups, urethane groups, urea groups, isocyanate groups, sulfo groups, and mixtures thereof, said matrix resin is selected from the group consisting of an unsaturated polyester resin, vinyl ester resin and phenol resin, said group capable of reacting with said matrix resin selected from the group consisting of hydroxyphenoxy groups, phenoxy groups, phenolic hydroxyl groups vinyl groups, acrylate groups, methacrylate groups and mixtures thereof, and said fiber surfaces have a surface oxygen concentration O/C ratio of from about 0.02 to about 0.3 as measured by X-ray photoelectron spectroscopy.

2. Carbon fibers, according to claim 1, wherein said surface of said carbon fibers includes a surface carboxyl group concentration COOH/C ratio of 0.2% to 3% as measured by the chemical modification X-ray photoelectron spectroscopy.

3. Carbon fibers, according to claim 1, wherein said polymer comprises the reaction product of the polymerization of a monomer having polar groups and groups capable of reacting with said matrix resin.

4. Carbon fibers, according to claim 1, wherein said matrix resin is an unsaturated polyester or vinyl ester resin, and the monomer comprises the composition prepared by reacting an unsaturated alcohol and an isocyanate compound.

5. Carbon fibers, according to claim 1, wherein the polymer contains 70 wt % or more of said monomer based on the weight of all of the monomers and the deposited amount of the polymer based on the weight of the carbon fibers is 0.01 to 5 wt %.

* * * * *